(12) United States Patent
Bousquet et al.

(10) Patent No.: US 9,557,211 B2
(45) Date of Patent: Jan. 31, 2017

(54) ACOUSTIC MEASUREMENT DEVICE IN AN AIR FLOW

(71) Applicant: Airbus Operations (S.A.S.), Toulouse (FR)

(72) Inventors: Philippe Bousquet, Blagnac (FR); Osmin Delverdier, Saint Jean Lherm (FR); Stefan Moal, Toulouse (FR)

(73) Assignee: AIRBUS OPERATIONS (S.A.S.), Toulouse (FR)

( * ) Notice: Subject to any disclaimer, the term of this patent is extended or adjusted under 35 U.S.C. 154(b) by 37 days.

(21) Appl. No.: 14/604,224

(22) Filed: Jan. 23, 2015

(65) Prior Publication Data
US 2015/0241267 A1    Aug. 27, 2015

(30) Foreign Application Priority Data
Feb. 18, 2014   (FR) ..................... 14 51265

(51) Int. Cl.
*G01H 3/10* (2006.01)
*G01H 3/00* (2006.01)
(Continued)

(52) U.S. Cl.
CPC ............ *G01H 3/10* (2013.01); *B64F 5/0045* (2013.01); *G01H 3/00* (2013.01); *H04R 1/08* (2013.01); *H04R 2499/13* (2013.01)

(58) Field of Classification Search
CPC ............ G01H 3/00; G01H 3/10; G01H 3/12; G01H 3/125; G01H 3/14; G01H 5/00; H04R 1/08; H04R 1/086; H04R 2499/13; H04R 3/005; H04R 1/406; H04R 2410/07; H04R 1/222; H04R 1/245; H04R 1/265; H04R 1/326; H04R 2201/401; H04R 2201/403; H04R 2410/00; H04R 9/08; H04R 11/04; H04R 17/02; H04R 19/04; B64F 5/0045
(Continued)

(56) References Cited

U.S. PATENT DOCUMENTS 4,236,040 A * 11/1980 Chung ..................... G01H 3/14
                                                73/646
7,340,068 B2 * 3/2008 Petersen ................. H04R 3/005
                                                381/111
(Continued)

FOREIGN PATENT DOCUMENTS

GB         2 446 619      8/2008
WO     WO 2014/025436    2/2014

OTHER PUBLICATIONS

Preliminary Search Report for French Application No. 1451265 dated Oct. 14, 2014.

*Primary Examiner* — Vivian Chin
*Assistant Examiner* — Jason R Kurr
(74) *Attorney, Agent, or Firm* — Jenkins, Wilson, Taylor & Hunt, P.A.

(57) ABSTRACT

An acoustic measurement device in an air flow and subjected to a noise source, the device including: a base having a surface in contact with the air flow, a first microphone which is mounted flush with the surface, a second and a third microphone which are mounted on either side of the first microphone, each, at the bottom of a cavity opening onto the surface, and where each of the second and third microphones is covered with a noise-reducing element, the second and the third microphones being assembled at a distance from the first microphone that is greater than the correlation length of the turbulent phenomenon in the frequency band studied, and a computer or processor provided for computing the
(Continued)

SINGLE PLATE power spectrum of the noise source from the signals detected by the three microphones.

3 Claims, 1 Drawing Sheet

(51) Int. Cl.
  *B64F 5/00* (2006.01)
  *H04R 1/08* (2006.01)
(58) Field of Classification Search
  USPC .............. 381/91, 346, 347, 353, 354, 355, 358,381/359, 360, 365, 92
  See application file for complete search history.

(56) References Cited

U.S. PATENT DOCUMENTS

| | | | | |
|---|---|---|---|---|
| 7,526,094 | B2* | 4/2009 | Hickling | H04R 3/04 381/338 |
| 8,391,529 | B2* | 3/2013 | Herman | H04R 1/086 381/345 |
| 8,867,773 | B2* | 10/2014 | Kimura | H04N 5/225 381/359 |
| 8,995,681 | B2* | 3/2015 | Kimura | G10L 21/034 381/359 |
| 9,294,829 | B2* | 3/2016 | Dannesboe | H04R 1/086 |
| 2009/0175466 | A1* | 7/2009 | Elko | H04R 3/005 381/94.2 |
| 2015/0139444 | A1* | 5/2015 | Frazier | H04R 1/406 381/92 |

* cited by examiner

SINGLE PLATE
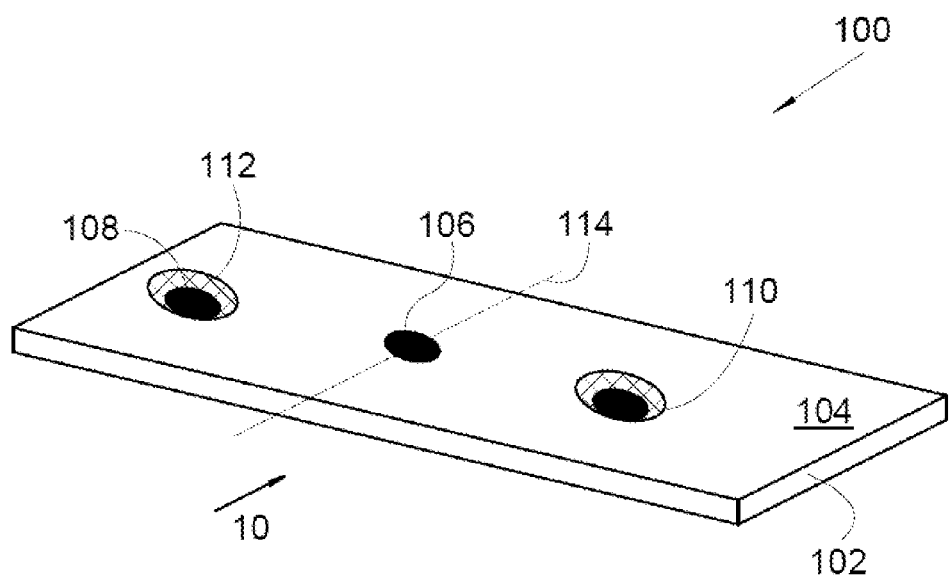

ACOUSTIC MEASUREMENT DEVICE IN AN AIR FLOW

CROSS-REFERENCE TO RELATED APPLICATION

This application claims priority to French Patent Application No. 14 51265 filed on Feb. 18, 2014, the entire content of which is incorporated by reference herein.

TECHNICAL FIELD

The present disclosure relates to an acoustic measurement device in an air flow.

BACKGROUND

In an aircraft, it is necessary to sound-insulate the cabin and the cockpit. To determine the quantity of sound insulation required to obtain good insulation, it is known to place a microphone on the skin of the aircraft and thus measure the noise received by the fuselage during a real or wind-tunnel flight. However, the measurements given by such a microphone are contaminated by the turbulence of the boundary layer, the intensity of which varies with the speed of the aircraft and as a function of the position of the microphone on the fuselage.

SUMMARY

A subject of the present disclosure is to provide an acoustic measurement device which makes it possible to improve the quality of acoustic measurements and to increase the signal-to-noise ratio of a microphone.

For this purpose, provision is made for an acoustic measurement device in an air flow and subjected to a noise source, the device including:
  a base having a surface in contact with the air flow,
  a first microphone which is mounted flush with the surface,
  a second and a third microphone which are assembled on either side of the first microphone, each, at the bottom of a cavity opening onto the surface, and in which each of the second and third microphones is covered with a noise-reducing element, the second and the third microphones being assembled at a distance 'd' from the first microphone that is greater than the correlation length of the turbulent phenomenon in the frequency band studied, and
  a computer provided and configured for computing the power spectrum of the noise source from the signals detected by the three microphones.

Such an acoustic measurement device makes it possible to obtain better results by comparison with devices of the prior art.

BRIEF DESCRIPTION OF THE DRAWINGS

The features of the subject matter disclosed herein, as well as others, will become more clearly apparent upon reading the following description of an exemplary embodiment, the description being made with reference to the single attached FIGURE which shows a measurement device according to the disclosure.

An aircraft has a skin, the outer surface of which is in contact with the air through which the aircraft is moving.

DETAILED DESCRIPTION

The single FIGURE shows an acoustic measurement device 100 in an air flow 10 and subjected to a noise source. The device 100 includes:
  a base 102 having a surface 104 in contact with the air flow,
  a first microphone 106 which is mounted flush with the surface 104, and
  a second and a third microphone 108 which are each assembled at the bottom of a cavity 110 opening onto the surface 104, and where each of the second and third microphones 108 is covered with a noise-reducing element 112.

The base 102 can be a part of the skin of the aircraft where a profiled plate is fastened to the skin of the aircraft.

The noise-reducing element 112 can be a micro-perforated material, a wire fabric, a film, etc.

Preferably, each cavity 110 is conic in shape but can be of any shape or filled with a porous material, the base of which is flush with the surface of the surface 104 and the axis of which is perpendicular to the surface 104.

The second and the third microphone 108 are each assembled at a distance 'd' from the first microphone 106 that is larger than the correlation length of the turbulent phenomenon in the frequency band studied. This distance 'd' can be determined experimentally by a coherence measurement in the absence of an acoustic source.

Preferably, the second and third microphones 108 are arranged on either side of the first microphone 106. That is to say, on either side of a line 114 running through the center of the first microphone 106 and parallel with the direction of the flow 10.

The device 100 also includes a computer or processor provided and configured for computing the power spectrum of the noise source from the signals detected by the three microphones 106 and 108. The computer, for example a central unit, implements a method for measuring the power of the noise source from the signals detected by the three microphones. This measurement method is based on a method described in the document titled "Rejection of flow noise using a coherence function method" by J. Y. CHUNG, published in 1977 in the Journal of the Acoustical Society of America 62, 388-395.

The method makes it possible to compute the autospectrum $G_{ss}$ of the noise source alone and is based on the following model:
  $s(t)$ is the acoustic signal of the noise source to be measured,
  $y_1(t)$ is the signal detected by the first microphone 106, this signal is made noisy by the noise $m_1(t)$, and $H_1$ is the acoustic response of the first microphone 106,
  $y_2(t)$ and $y_3(t)$ are the signals detected by the second and the third microphone 108 respectively, these noise signals are made noisy by the noise signals $m_2(t)$ and $m_3(t)$ respectively, and $H_2$ and $H_3$ are the respective acoustic responses of the second and the third microphone 108 equipped with the noise reduction device 110 and 112,
  $x_1(t)$, $x_2(t)$ and $x_3(t)$ are the acoustic distributions of the signal $s(t)$ on the first 106, second 108 and third 108 microphones respectively.

Thus $y_1(t)=x_1(t)+m_1(t)$, $y_2(t)=x_2(t)+m_2(t)$, and $y_3(t)=x_3(t)+m_3(t)$.

The acoustic responses $H_2$ and $H_3$ can be considered as linear and time-invariant whereas the response $H_1$ to the acoustic waves is a unit response so that $s(t)=x_1(t)$.

The noise signals $m_1(t)$, $m_2(t)$ and $m_3(t)$ are considered to be mutually uncorrelated.

The coherence function is a function of the frequency domain which is computed to show the linear relation between the input and the output of a system. The coherence between two signals $y_1(t)$ and $y_2(t)$ is the real function defined by:

$$\gamma_{y_1 y_2}^2 = \frac{|G_{y_1 y_2}|^2}{G_{y_1 y_1} \cdot G_{y_2 y_2}}, \quad (1)$$

where $G_{y_1 y_2}$ is the cross-spectral density between $y_1(t)$ and $y_2(t)$, and where $G_{y_1 y_1}$ and $G_{y_2 y_2}$ are the power spectral densities $y_1(t)$ and $y_2(t)$ respectively.

As $m_1(t)$ and $m_2(t)$ are not correlated, $G_{y_1 y_2} = G_{x_1 x_2}$, and the formula (1) then becomes:

$$\gamma_{y_1 y_2}^2 = \frac{|G_{x_1 x_2}|^2}{(G_{x_1 x_1} \cdot G_{m_1 m_1})(G_{x_2 x_2} \cdot G_{m_2 m_2})}$$

as $$\gamma_{x_1 x_2}^2 = \frac{|G_{x_1 x_2}|^2}{G_{x_1 x_1} \cdot G_{x_2 x_2}},$$

the formula (1) can be written:

$$\gamma_{y_1 y_2}^2 = \frac{\gamma_{x_1 x_2}^2}{1 + \frac{G_{m_1 m_1}}{G_{x_1 x_1}} + \frac{G_{m_2 m_2}}{G_{x_2 x_2}} + \frac{G_{m_1 m_1}}{G_{x_1 x_1}} \cdot \frac{G_{m_2 m_2}}{G_{x_2 x_2}}}.$$

$$a = \frac{G_{x_1 x_1}}{G_{m_1 m_1}}$$

denotes the signal/noise ratio of the first microphone 106, and $$b = \frac{G_{x_2 x_2}}{G_{m_2 m_2}}$$

the signal/noise ratio of the second microphone 108.

$H_2$ being linear and time-invariant (LTI), then $\gamma_{x_1 x_2}^2 = 1$. The formula (1) then becomes:

$$\gamma_{y_1 y_2}^2 = \frac{ab}{1 + a + b + ab}. \quad (2)$$

The same computations for $\gamma_{y_1 y_3}^2$ and $\gamma_{y_2 y_3}^2$ give $$\gamma_{y_1 y_3}^2 = \frac{ac}{1 + a + c + ac} \quad (3)$$

and $$\gamma_{y_2 y_3}^2 = \frac{bc}{1 + b + c + bc}, \quad (4)$$

where $$c = \frac{G_{x_3 x_3}}{G_{m_3 m_3}}$$

is the signal/noise ratio of the third microphone 108, and with $\gamma_{x_1 x_2}^2 = 1$ and $H_3$ is linear and time-invariant.

Substituting the terms a, b and c in equations 2, 3 and 4, one obtains:

$$G_{x_1 x_1} = G_{y_1 y_1} \cdot \frac{\gamma_{y_1 y_2} \cdot \gamma_{y_1 y_3}}{\gamma_{y_2 y_3}}.$$

And finally $$G_{SS} = G_{x_1 x_1} = G_{y_1 y_1} \cdot \frac{\gamma_{y_1 y_2} \cdot \gamma_{y_1 y_3}}{\gamma_{y_2 y_3}}.$$

Thus, by computing the coherence functions from the three noisy signals $y_1(t)$, $y_2(t)$ and $y_3(t)$, the Chung method makes it possible to extract the power autospectrum $G_{ss}$ from the source of the spectrum of the noisy signal $G_{y_1 y_1}$.

The device according to the subject matter disclosed herein is an improvement on the CHUNG method.

The device according to the subject matter disclosed herein makes it possible to remove the noise from the signal sensed by the microphone 106 using the microphones 108 assembled in the cavities without it being necessary to carry out a correction of the frequency response. Indeed, the first microphone 106 has a smooth frequency response H1 that does not need to be corrected whereas the second and third microphones 108 are used to measure the coherence, and an irregularity in their frequency responses H2 and H3 is of little importance since the coherence gives the level of linear dependence between the different signals.

Thus, according to the subject matter disclosed herein, the combined effects of the cavity 110 and the noise-reducing element 112, and the effects of the speed on the computation of the power of the noise source do not need to be corrected.

The proposed method makes it possible to derive benefit from the increase in the signal/noise ratio procured by assembly in a cavity while also avoiding calibration problems. The increase in the signal/noise ratio contributed by the cavities reduces the time required for measuring the coherence functions, which reduces the total time required for the acquisition of the signal. The method also makes it possible to shorten the measurement time without loss of accuracy or to increase the accuracy for a given measurement period.

While at least one exemplary embodiment of the subject matter disclosed herein(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An acoustic measurement device for use in an air flow and for being subjected to a noise source, the device comprising:
   a base having a surface in contact with the air flow;
   a first microphone which is mounted flush with the surface;
   second and third microphones mounted on either side of the first microphone, each at a bottom of a cavity which opens onto the surface, wherein each of the second and third microphones is covered with a noise-reducing element, the second and the third microphones being assembled at a distance from the first microphone that is greater than a correlation length of a turbulent phenomenon in a frequency band studied, and
   a computer configured for computing a power spectrum of the noise source from signals detected by the three microphones.

2. The device according to claim 1, wherein the second and third microphones are arranged on either side of a line running through a center of the first microphone and which is parallel with a direction of flow.

3. The device according to claim 1, wherein each cavity has a shape of a cone, a base of which is flush with the surface and an axis of which is perpendicular to the surface.

* * * * *